Jan. 22, 1963  J. B. WIENER  3,074,551
CARD PROCESSING APPARATUS
Filed Feb. 24, 1959  5 Sheets-Sheet 5

Fig. 9

INVENTOR:
Jerome B. Wiener
Attorneys

United States Patent Office 3,074,551
Patented Jan. 22, 1963

3,074,551
CARD PROCESSING APPARATUS
Jerome B. Wiener, Yorktown Heights, N.Y., assignor to The Magnavox Company, Los Angeles, Calif., a corporation of Delaware
Filed Feb. 24, 1959, Ser. No. 795,071
6 Claims. (Cl. 209—111.5)

The present invention relates to card processing apparatus for handling information storage cards on which data is recorded. The invention is more particularly directed to an improved card processing apparatus for effectively sorting the information storage cards in accordance with the information recorded on the individual cards.

Card processing systems and apparatus with which the present invention is concerned make use of a plurality of information storage cards on which data is recorded by any one of several different techniques. The information may, for example, be recorded on the individual cards in the form of patterns of punched holes, in the form of discrete magnetized areas of north or south polarity, or in any other suitable form.

The apparatus of the present invention will be described in conjunction with information storage cards on which information is recorded in the form of multi-digit binary numbers and by means of discrete magnetized areas. With the particular type of recording to be described, a first magnetic polarity of a magnetized area represents binary 1, and the opposite magnetic polarity represents binary 0. Also in the embodiment of the invention to be described the multi-digit binary numbers represented by the magnetized area at respective positions on the cards are arranged to represent decimal digits from 0 to 9 at each such position. Moreover, the decimal digits represented at successive positions along each card are so arranged in increasing ordinal significance from one end of the card to the other.

It will become apparent as the description proceeds, however, that any desired type of recording may be used for the individual cards, and any recording code may be utilized. This is because the apparatus of the invention is not dependent upon any particular type of recording. It is merely necessary to provide appropriate transducer means to convert input electrical signals into the particular type of recording indicia, and vice versa. It is also possible for the cards to contain recordings which are not in bit form, such as magnetic letters and the like. For the latter type of recordings, suitable translators are provided to convert the recorded characters into bit form.

Due to the complexity of large business organizations, card processing systems utilized in conjunction with such business organizations often entail the use of hundreds of thousands of information storage cards. A pressing problem that has arisen has been to devise suitable systems and apparatus for handling and sorting the cards rapidly and efficiently. It is also important that such equipment use a minimum number of components and a minimum amount of space, and yet that it be capable of operating with a high degree of precision. The apparatus of the present invention successfully solves these problems.

Systems and apparatus using rotatable vacuum pressure transport drums have been proposed and constructed for selecting, merging, sorting, collating and for otherwise processing the information storage cards. In such apparatus, cards are selectively fed to the peripheral edge of a transport drum (or other transport medium) from an input station which is positioned adjacent the drum. The drum is rotatable and a vacuum pressure is provided at its peripheral edge to hold the transported cards securely on that edge. The drum either is used alone, or in conjunction with other similar drums, to carry cards past a reading or writing transducing station at which the cards are processed by suitable transducers. This processing, for example, may establish certain sorting controls and the cards may be selectively transferred to other drums under the action of these controls. These other drums may then carry the cards to the selected output stations into which the cards are deposited.

A vacuum pressure rotatable transport drum, similar in concept to the drums referred to in the preceding paragraph, will be described in detail subsequently in the present specification. This drum, as will be described, is equipped with a plurality of coaxial spaced annular slots extending around its periphery. The drum is hollow, and air is drawn in through its hollow interior and inwardly through the slots to create a vacuum pressure at the peripheral surface of the drum. This vacuum pressure, as noted above, enables the cards to be firmly retained on the peripheral edge of the drum for circulation by the drum from the input station to the output stations.

Copending application Ser. No. 731,413 which was filed April 28, 1958 in the name of Eric Azari, now Patent No. 2,981,411, describes another type of transport member for information storage cards. The transport member described and claimed in the copending application includes a stationary guiding surface for transporting the information cards along a predetermined path. A series of pressurized fluid jets are directed at an angle through the guiding surface and at spaced positions along the path. The pressurized fluid streams emitted by the jets set up a Bernoulli effect between the cards and the guiding surface. This effect causes the cards to be moved rapidly along the selected path and in intimate contact with the guiding surface.

As pointed out in the copending Azari application, the structure of the transport member disclosed and claimed in that application can take the form of a stationary cylinder, with the fluid jets being suitably positioned to cause the cards to be rapidly transported around the peripheral surface of the stationary member. It will become evident as the present description proceeds that the apparatus to be described in conjunction with the present invention may incorporate either a rotatable drum of the type described above or it may incorporate the stationary drum of the copending Azari application.

Copending application Ser. No. 752,953 which was filed August 4, 1958 in the name of Eric Azari et al., now Patent No. 2,977,674, discloses apparatus using the stationary Bernoulli type of transport member described above to perform certain sorting operations on the cards. The embodiment of the apparatus described in the latter copending application includes a stationary transport member in the form of an elongated hollow cylinder having a plurality of spiral guide paths formed in its surface, with associated pressurized fluid jets extending into the guide paths from the interior of the transport member.

The sorting apparatus of the present invention may also use an elongated stationary cylindrical transport member of the type mentioned in the preceding paragraph. The transport member utilized in the embodiment of the present invention to be described is provided with a helical guiding surface which serves to transfer the cards in a spiral path around the cylindrical transport member from one end of the member to the other. It will become apparent, however, that other configurations may be used, other than helical, for the guiding surfaces.

Alternately, the invention may use an elongated rotating transport drum similar to the type described previously. The drum includes guides for causing the cards transported by the drum to move in a spiral path along the drum surface as the cards are circulated by the drum.

The embodiment of the invention to be described utilizes a pair of transport members which are positioned adjacent each other. The first transport member, in the manner described briefly above, causes the cards to move from an input station along a spiral path from one of its ends to the other. The second transport member, as also described briefly above, causes the cards to move in annular paths around its peripheral edge. As also noted, these transport members may either be stationary and have the cards transported on their surfaces in accordance with Bernoulli principles in the described manner, or they may be rotatable and transport the cards in the manner also described above.

A separate transfer unit is positioned at each of the adjacent points of the respective annular guide paths of the second transport member and the spiral guide path of the first transport member. These transfer units are controlled so that cards may be selectively transferred from the spiral path of the first transport member to selected ones of the annular paths on the second transport member. This selective transfer may, for example, be in accord with the equivalent decimal digits of from "0" to "9" at any selected level of ordinal significance. The information storage cards, for example, may have digital information recorded on them in a plurality of columns of magnetic areas of discrete magnetic areas extending across each card, with one column being adjacent the other and with each column defining a different position on the card. The binary digits in the different columns may, as mentioned above, represent decimal digits of from "0" to "9," with the significance of the decimal digits increasing from one end of the card to the other.

The transfer of the cards from the first transport member to selected ones of the annular paths of the second transport member may be such, therefore, that the cards representing the same decimal digits at the particular level of ordinal significance are all transferred to the same annular path on the second transport member. Therefore, if ten annular paths are provided on the second transport member, these paths may respectively transport transferred cards representing the decimal digits of from "0" to "9" at the particular ordinal level.

Each of the annular guide paths on the second transport member may have a plurality of output stations associated with it. These output stations may be of the "pass-under" type described in copending application 742,546 filed June 17, 1958 in the name of Alfred M. Nelson et al., now Patent No. 3,016,239. The output stations described in the copending application are each controllable to permit any card transported to its mouth either to pass under the station and continue on its way, or to be deposited in the station. This permits a plurality of such output stations to be disposed along a common transport path, so that the cards may selectively be deposited in different ones of the output stations.

The output stations associated with any particular guide path on the second transport member may be controlled so that the cards representing different decimal digits at a different ordinal level from the level discussed above are deposited in different ones of those output stations.

Therefore, a sorting operation on the cards for two levels of ordinal significance can be carried out in a single pass. For example, the transfers of cards from the first transport member to the different annular paths of the second transport member can first be made in accordance with the second-to-least significant decimal digits, that is, the "tens" digits. Then, the deposit of cards on any one of the annular paths of the second transport drum into the output stations associated with that path can be in accordance with the decimal digits of least significance, that is, the "ones" digits. The process can then be repeated for the decimal digits of the next two levels of significance, and so on until a complete sort has been obtained.

It will be appreciated, however, that the sorting capabilities of the apparatus of the present invention are not limited to a decimal sort, and that the apparatus may be used to perform binary sorts and other sorting operations. It will also be appreciated that the invention provides efficient and compact equipment for rapidly and accurately performing a desired sorting operation on a group of cards introduced into the apparatus.

Figure 1:
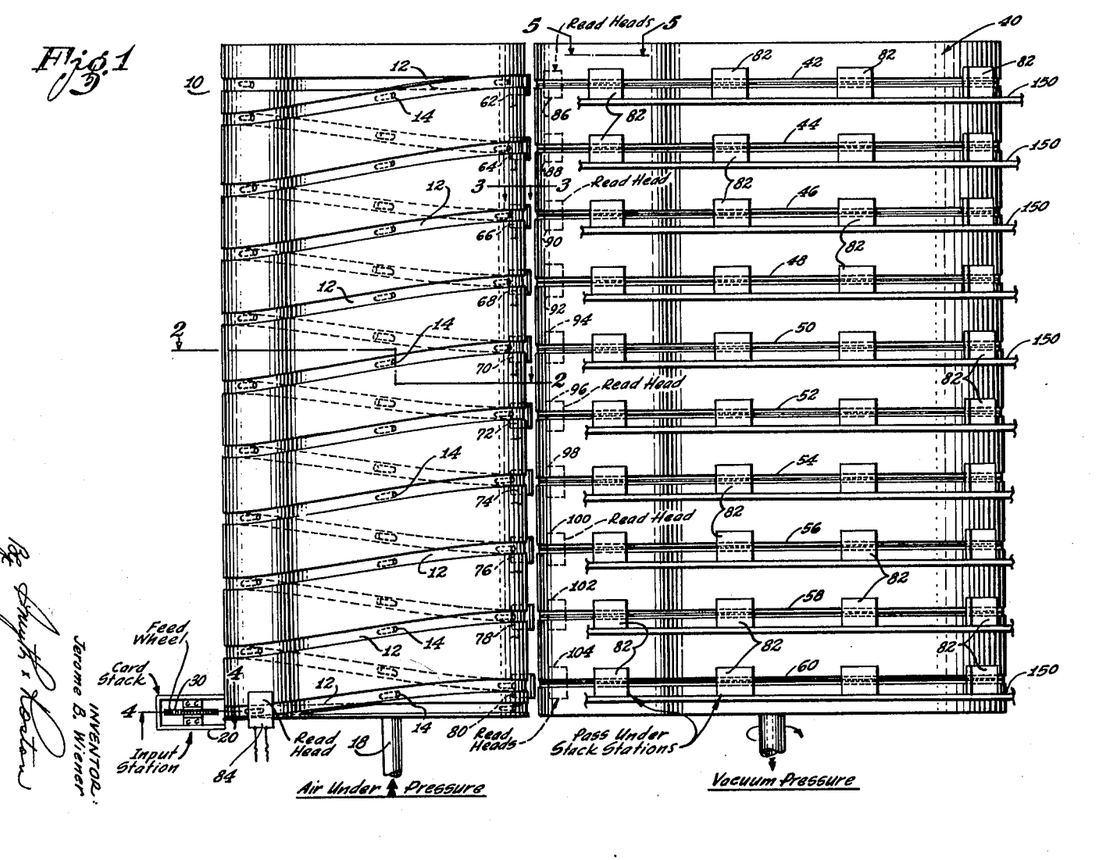
FIGURE 1 is a side elevational view of one embodiment of the sorting apparatus of the present invention, and illustrating a first transport member having spiral paths for carrying information storage cards around the periphery of the member from one end to the other and also illustrating a second transport member having spaced annular paths, with means for transferring the cards from the spiral paths of the first member to the various annular paths of the second.

The sorting apparatus of the present invention, as illustrated in FIGURE 1, includes a first transport member 10 which is illustrated as being in the form of an elongated stationary hollow cylinder. As noted above, this transport member may be stationary, or it may be rotatable. Assuming that the member is stationary, a spiral path is provided which extends in a helical manner from the lower left hand corner of the member to the upper right hand corner. This helical path is designated 12, and it has a plurality of angled orifices which extend from the hollow interior of the member (see FIGURE 2). These orifices are designated as 14, and they are spaced at predetermined positions along the spiral path and at a predetermined angle in the direction of card motion along the path. The hollow interior of the transport member 10 forms a chamber 16. Pressurized fluid, such as compressed air, is introduced into the chamber 16 through a pipeline 18 which extends through the lower end of the transport member.

As fully described in the copending applications 731,413 and 752,935, the pressurized air within the chamber 16 is emitted by the orifices 14 to form a plurality of pressurized fluid jets which set up a Bernoulli effect so that the information cards are rapidly transported about the spiral path 12 from one end of the transport member 10 to the other.

Figures 2, 3, 4, 5, 7:
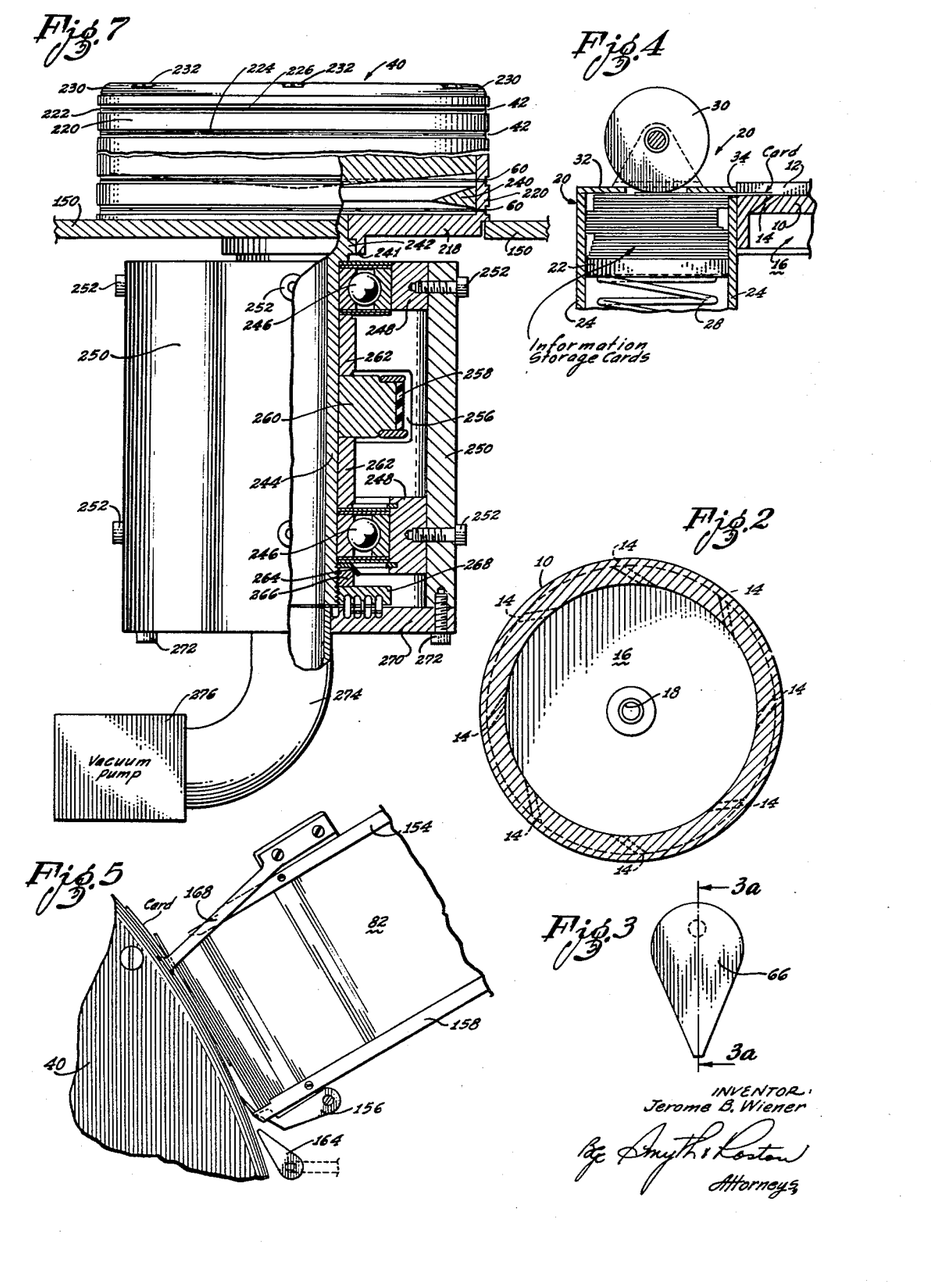
FIGURE 2 is a cross-sectional view substantially on the line 2—2 of FIGURE 1 to illustrate the hollow interior of the first one of the transport members and the manner in which air under pressure is introduced to that interior.
FIGURE 3 is a top plan view of one of the transfer members, which members are used for transferring the information cards from one of the transport members of FIGURE 1 to the other, the view of FIGURE 3 being substantially on the line 3—3 of FIGURE 1.
FIGURE 4 is a fragmentary side sectional view, substantially on the line 4—4 of FIGURE 1, of an input station which is utilized to feed the information cards to one of the transport members of FIGURE 1.
FIGURE 5 is a top plan view, substantially on the line 5—5 of FIGURE 1, and showing the details of one of a plurality of output stations associated with one of the transport members of FIGURE 1.
FIGURE 7 is a side elevational view, partly in section, of the second one of the transport members, this latter view illustrating constructional details of the manner in which the second transport member can be rotatably mounted and how it may be activated.

The information storage cards are originally held in a stacked condition in an input station 20 which is positioned at the lower left hand end of the transport member 10 at the mouth of the spiral path 12. The input station 20 is illustrated in more detail in FIGURE 4. As shown in FIGURE 4, the input station has its mouth positioned adjacent the entrance of the path 12. The input station 20 is adapted to hold the information storage cards in a stacked condition as shown in FIGURE 4. This station includes a pusher member 22 which is biased upwardly between a pair of side walls 24 and 26 by means of a spring 28. The cards are supported in a horizontal position on top of the pusher member 22, and the spring 28 causes the pusher to urge the cards toward the top of the station.

A rotatable feed wheel 30 is mounted at the top of the station 20 in FIGURE 4, and the feed wheel extends through a cover 32 of the station and engages the top card in the station. The cover 32 defines a throat 34 with the side wall 24, and this throat is aligned with the entrance of the spiral path 12. The feed wheel 30 is rotated so that it moves one card at a time through the throat 34 into the path 12 so that the moved card may come under the influence of the pressurized fluid emerging from the adjacent orifice 14 to be carried rapidly along the path. The particular input station described above and illustrated in FIGURE 4 exemplifies one of many typical means that may be used for feeding cards to the spiral path 12 of the transport member 10. For example, the cards may be stacked in individual magazines, and the magazines may be selectively brought into position, either by manual or mechanical means, so that the stacked cards therein may be successively fed to the path 12 of the transport member 10.

The sorting apparatus of the invention also includes a second transport member 40. As described above, the second transport member may be rotatable, and it may utilize a vacuum pressure for holding the cards on its peripheral surface. As an alternative, the transport member 40 may be stationary and utilize the Bernoulli effect. For purposes of the present description, the transport member will be considered as being rotatable.

The rotatable transport member 40 includes a plurality of pairs of annular slots which extend about its peripheral surface and which are spaced axially along the member coaxial with its axis of rotation. These pairs of slots are designated as 42, 44, 46, 48, 50, 52, 54, 56, 58 and 60 in FIGURE 1. As will be described in detail in conjunction with FIGURE 7, a vacuum pressure is established in the hollow interior of the rotatable transport member 40 to establish a vacuum holding effect at each pair of annular slots. This permits any card fed to any one of the pairs of slots to be firmly held on the peripheral surface of the transport member 40 and circulated by the transport member. In the illustrated embodiment, ten pairs of annular slots are illustrated (42, 44, 46, 48, 50, 52, 54, 56, 58 and 60) for the member 40 so that the member can perform a decimal sort with the decimal digits of 0 to 9, inclusive, being respectively allocated to the pairs of slots.

As illustrated in FIGURE 1, the transport members 10 and 40 are positioned adjacent one another, and the spiral path 12 is shaped and positioned so that it meets a corresponding one of the annular pairs of slots 42, 44, 46, 48, 50, 52, 54, 56, 58 and 60 at the adjacent line of the two members. A corresponding plurality of transfer members 62, 64, 66, 68, 70, 72, 74, 76, 78, 80 are positioned between the two transport members to effect transfers of the cards from the spiral path 12 on the transport member 10 to selected ones of the pairs of annular slots on the transport member 40.

A plurality of pass-under output stations 82 are positioned adjacent respective ones of the pairs of slots 42, 44, 46, 48, 50, 52, 54, 56, 58 and 60 of the transport member 40. For example, for a decimal sort, ten output stations are positioned to be adjacent each one of the pairs of slots on the transport member 40. These output stations are controlled in a manner to be described so that the cards transported on the transport member 40 may be selectively deposited in different ones of the output stations. For example, for any particular pass, the cards representing decimal digits of from 0 to 9 at a particular level of ordinal significance (such as the "tens" digits, for example,) are selectively transferred from the spiral path 12 on the transport member 10 to the ones of the pairs of slots on the transport member 40 respectively corresponding to the different decimal digits. Then, the cards transported on the drum 40 adjacent the various pairs of slots are selectively deposited in the different output stations in accordance with the decimal digits represented by them at another level of ordinal significance (such as the "ones" digits, for example). It is in this manner, that the cards may be sorted in a single pass with respect to two levels of ordinal significance. That is, in one pass the cards may (for example) be sorted in accordance with decimal digits of from 0 to 100.

Read head transducing means 84 are positioned adjacent the spiral path 12 on the transport member 10 for processing the information storage cards introduced to the path from the input station 20. These transducing means may compromise a plurality of electro-magnetic read head transducers, with each read head being positioned to process a different row of magnetic areas on each card. Therefore, the read heads of the transducing means 84 may be controlled to provide a parallel read out of each position of each card, as the information cards are moved under the transducing means along the path 12.

Similar read head transducing means 86, 88, 90, 92, 94, 96, 98, 100, 102 and 104 are positioned adjacent respective ones of the pairs of slots 42, 44, 46, 48, 50, 52, 54, 56, 58 and 60 of the transport member 40. The latter read head transducer means may all be similar in their construction to the read head transducer means 84. The transducer means 84, in a manner to be described, controls the transfer of the cards from the spiral path 12 of the transport member 10 to respective ones of the pairs of slots of the transport member 40. The transducer means 86, 88, 90, 92, 94, 96, 98, 100, 102 and 104, on the other hand, controls the deposit of cards in selected output stations 82 associated with the different pairs of slots.

Figures 3A, 6:
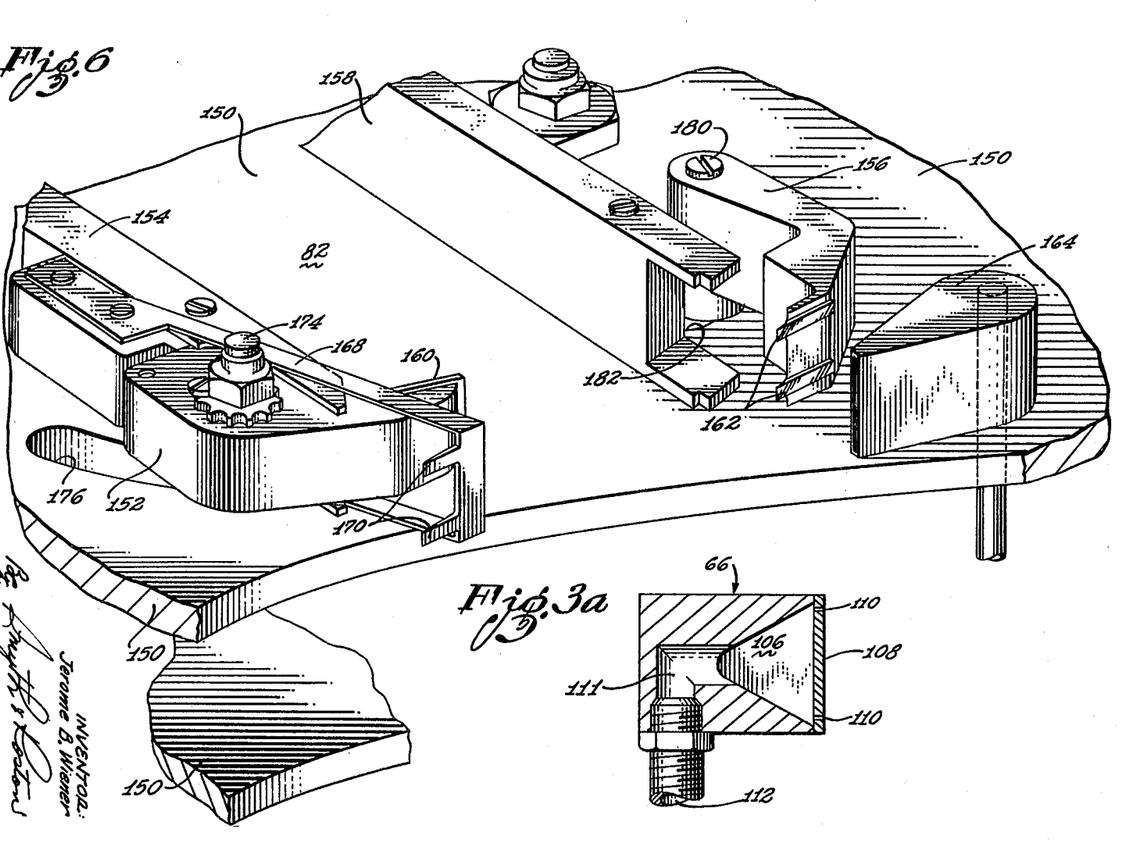
FIGURE 3a is a side sectional view, substantially on the line 3a—3a of FIGURE 3, of the transfer member.
FIGURE 6 is a perspective view of the output station of FIGURE 5 and illustrates in more detail the various components which make up the output station and which are controlled to cause cards either to be deposited in the station or to pass under the mouth of the station.

As shown in FIGURE 3, the transfer members such as the member 66 each has a tear-drop configuration when viewed in plan. The transfer member, as shown in FIGURE 3a, has a bell-shaped internal chamber 106. This chamber has a thin apertured strip 108 secured to its forward end, and the strip has a pair of apertures 110 formed in it through which pressurized streams of fluid, such as air, may emerge.

The throat of the bell-shaped chamber 106 is coupled to a conduit 111 which, in turn, is connected to a pipe line 112. When pressurized fluid, such as air, is introduced through the pipe line 112 and through the conduit 111 to the chamber 106, pressurized streams of air are caused to emerge from the aperture 110. These streams are directed tangentially of the transport member 10 so that any card transported on the spiral 12 and coming under the influence of the streams is stripped outwardly from the surface of the transport member 10 and moved over the corresponding one of the transfer members 62, 64, 66, 68, 70, 72, 74, 76, 78, 80 into the field of influence of the corresponding pairs of slots on the transport member 40. Therefore, when any one of the gate transfer members 62, 64, 66, 68, 70, 72, 74, 76, 78 or 80 is activated, a card transported on the path 12 and coming under the influence of the activated transfer member is transferred from the transport member 10 to one of the pairs of slots 42, 44, 46, 48, 50, 52, 54, 56, 58, 60 on the transport member 40 adjacent the activated transfer member.

The details of one of the pass-over output stations 82 are shown in FIGURES 5 and 6. As noted previously, these output stations may be of the type disclosed and claimed in copending application, Ser. No. 742,546. The particular type of output station described in the copending application has a reversible feature. This feature permits the station to operate as an output station for one operational mode and to operate as an input station for a second operational mode. The particular station 82 illustrated in FIGURES 5 and 6 of the present specification is likewise a reversible type of station.

The reversible card holding station 82 is mounted on a supporting shelf 150, with its mouth in contiguous relationship with the peripheral surface of the transport member 40. As noted previously, the stations 82 are positioned in cooperating relationship with different ones of the pairs of slots, 42, 44, 46, 48, 50, 52, 54, 56, 58, 60 in the transport member 40. The reversible card holding station 82 is illustrated in FIGURE 5 in its stacking mode, and is illustrated in FIGURE 6 in its feeding mode. The station includes a vacuum pressure feed head 152 which is pivotally mounted adjacent the leading wall 154 of the station. This feed head is not shown in FIGURE 5, for purposes of clarity. The station also has a stack head 156 which is pivotally mounted adjacent the trailing wall 158 of the station. The construction and operation of the feed head 152 and of the stack head 156 are similar to the reversible station disclosed and claimed in copending application 645,639 filed March 12, 1957 in the name of Alfred M. Nelson et al.

The feed head 152 is controlled to exert a vacuum pressure at its surface 160 when the station is in its feeding mode at which the feed head is moved to its operative position as illustrated in FIGURE 6. This vacuum pressure is controllable, and it is exerted on the trailing portion of the leading card in the card holding station 82. The same leading card rests on the periphery of the transport member 40 against one of the pair of slots in that member. The transport member 40 therefore exerts a force on the card tending to withdraw it from the station.

The stack head 156 is withdrawn to its standby position, as illustrated in FIGURE 6, when the station is conditioned to its input or feeding mode. When the stack head is in its standby position, it is withdrawn from the periphery of the transport member 40 so that cards are free to move from the station 82 onto the periphery of the transport member 40 whenever the vacuum pressure is released from the face 160 of the feed head 152.

The force exerted by the vacuum pressure in the periphery of the transport member 40 tends to withdraw the leading card from the station 82, as noted above, whereas the force exerted by the feed head 152 tends to retain the card in the holder. The force exerted by the feed head is made the greater of the two so that it is able to overcome the force exerted on the leading card by the transport member 40. So long as the leading card is held in this manner in the station 82, the other cards are supported in stacked relationship in the station.

Whenever the vacuum pressure to the surface 160 of the feed head 152 is interrupted, the leading card in the station 82 is withdrawn by the transport member 40. The next card in the station now comes into position and it is retained in the station until the next interruption of the vacuum pressure to the feed head 152. The trailing wall 158 of the station forms a throat with the periphery of the transport member 40, and this throat has a width which is a little greater than the thickness of a single card. Therefore, whenever the vacuum pressure of the feed head 152 is interrupted, only one card at a time is able to pass out of the station and onto the periphery of the transport member.

The provision of feed heads in the station 82 permits these stations to be controlled at the end of a sorting pass so that all the cards may be removed in sequence from each station and deposited in a common output station. This forms a convenient means for bringing the cards together into a single stack at the end of each pass so that they may be placed in the input station 20 of FIGURE 1 in readiness for the next pass.

In the stacking operational mode of the reversible card holding station 82, the feed head 152 is withdrawn to a standby position and its vacuum pressure is turned off in a manner fully described in the copending application 645,639 referred to above. The stack head 156 is simultaneously moved into its operative position in which its leading edge projects into the station to hold cards in the station in a stacked condition. When the stack head 156 is so moved to its operative position, the lower face of the stack head, which includes a pair of spaced parallel rails or fingers 162, is spaced from the periphery of the transport member 40. This enables cards transported on the periphery of the transport member to pass across the mouth of any one of the stations 82 and under the station, even though the corresponding stack head 156 is moved to its operational state.

A blower member 164 is mounted on the supporting shelf 150 adjacent the stack head 156. This blower member may be similar in its construction to the gate transfer member 66 described in conjunction with FIGURES 3 and 3a. The blower member 164 is also positioned to be spaced from the periphery of the transport member 40, so that an information storage card transported on that periphery may be carried past the stack head 156 and past the blower member 164. However, the blower member is positioned to introduce a stream of fluid, such as pressurized air tangentially of the surface of the transport member 40 between the stack head 164 and that surface. This stream of pressurized fluid may be electrically controlled by means of a usual solenoid valve in a pressure line 166 extending to the blower. Whenever the solenoid valve is activated so that the blower emits the stream of pressurized fluid, a card transported on the periphery of the transport member 40 coming under the influence of the pressurized fluid has its leading edge stripped from the periphery of the drum by the fluid to extend over the stack head so that the card is arrested by the stack head.

A pick-off member 168 is positioned adjacent the leading wall 154 of the reversible station 82, and this pick-off member has a pair of fingers 170 (as shown in FIGURE 6) which extend into a corresponding pair of peripheral grooves on the transport member 40, these grooves being disposed adjacent respective ones of the slots in each of the pairs of slots 42, 44, 46, 48, 50, 52, 54, 56, 58, 60. The fingers 170 are humped radially outward so that the cards transported on the periphery of the transport member 40 ride over the fingers and are lifted outwardly from the periphery. Any card arrested by the stack head 156 due to the activation of the blower 164 has its trailing edge projecting over the fingers 170. The second card transported by the same pair of slots of the transport member 40 rides up over the fingers 170 and under the preceding card to pry the preceding card from the periphery of the drum. The second card may also be stopped by the stack head 156 when the blower 164 is activated so as to deposit the preceding card in the station. Alternately, the second card may pass up over the pick-off 168 and under the stack head 156 when the blower 164 is not activated, and the second card may then continue on the periphery of the transport member 40.

The leading and trailing walls 154 and 158 of the station 82 in FIGURES 5 and 6 are parallel to one another and are spaced a distance corresponding substantially to the length of the information storage cards. The cards are stacked in the station between the walls in generally vertical planes with their lower edges resting on the supporting shelf 150. The forward end of the shelf 150 has an arcuate shape to receive the periphery of the rotatable transport member 40.

The feed head 152 is pivotally mounted adjacent the end of the wall 154 on a pivot shaft 174, and the feed head is movable in an arcuate slot 176 in the supporting shelf 150. The arrangement is such that when the feed head is moved to a standby position, it is retracted out of the mouth of the station.

The pick-off member 168 has a supporting bracket portion which defines a rectangular area through which the feed head 152 is movable. As noted above, the pick-off member includes a plurality of humped fingers 170, which are adapted to extend into peripheral grooves in the adjacent pair of slots in the rotatable transport member 40. As mentioned previously, the forward end of the side wall 158 defines a throat area with the periphery of the transport member. This throat area has a width sufficient to pass only a single card whenever the vacuum pressure at the surface 160 of the feed head is interrupted. The stack head is mounted in a pivoted shaft 180, and it is movable in a slot 182 in the supporting surface 150.

When the feed head 152 is in its operative position for the feeding mode of operation of the station, the stack head 156 is withdrawn to its standby position and the cards are free to pass one at a time through the throat area described above. However, when the stack head 156 is moved to its operative position for the stacking mode of operation of the station, and the feed head 152 is retracted, the fingers 162 of the stack head move between the end of the wall 158 and into the mouth of the station to form a supporting lip for the cards in the station. The stack head blocks the throat area insofar as these cards are concerned, and it causes cards in the station to be retained.

As noted above, and as more clearly shown in FIGURE 5, the face of the stack head 156 is spaced from the periphery of the transport member 40 when the stack head is in its operative position. This spacing of the stack head permits cards to be transported on the periphery of the transport member past the station. The blower member 164 is mounted on the surface 150 in the illustrated position in FIGURES 5 and 6. The details of this blower member, as mentioned above, may be similar to those described in conjunction with the gate transfer member 66 in FIGURE 3a. As noted, the blower member 164 serves to controllably introduce a stream of pressurized fluid tangentially of the peripheral surface of the transport member 40 and between the transport member and the stack head 156 for the reasons described above.

The feed head 152 and the stack head 156 may be controlled by a system of cams and cam followers in the manner described, for example, in copending application Serial No. 645,639 filed March 12, 1957 in the name of Alfred M. Nelson et al., now Patent No. 2,969,979. These mechanisms provide an appropriate control so that in one operating mode the feed head 152 is moved forward to its operative position and the stack head 156 is retracted to its standby position, as shown in FIGURE 6; and in a second operating mode, the stack head 156 is moved forward to its stacking position and the feed head 152 is retracted to its standby position, the view of FIGURE 5 showing the stack head in its operative position but omitting the feed head for purposes of simplicity.

The rotatable transport member 40 may be constructed in the manner shown in FIGURE 7. This construction is similar in some respects to the construction of the rotatable vacuum transport drum disclosed and claimed in copending application Ser. No. 600,975 which was filed July 30, 1956 in the name of Loren R. Wilson (now Patent 2,883,189). The rotatable transport member 40 of FIGURE 1 is different from the rotatable drum disclosed in the copending application 600,975 only in that the transport member of FIGURE 1 includes a plurality of pairs of annular slots to form a corresponding plurality of circulating paths, whereas the rotatable drum of the copending application discloses a single pair of annular slots for a single circulating path.

As shown in FIGURE 7, the transport member 40 has a lower section and an upper section. The lower section of the transport member includes a disk-like bottom portion 218 and an integral side portion 220. The pairs of annular peripheral slots 42, 44, 46, 48, 50, 52, 54, 56, 58 and 60 referred to in FIGURE 1 are formed in the side portion 220 and extend through the side portion. Each of these annular slots has an external groove 221 associated with it, as mentioned above, for receiving the fingers 170 of the pick-off member 168. The peripheral slots of each pair may be discontinuous in that they may be interrupted at selected intervals by a series of ribs (not shown) which are integral with the side portion 220. These ribs are fully disclosed in Patent 2,883,189.

The upper section of the transport member 40 is in the form of a disk-like member 230 which engages the annular side portion 220 of the lower section at the upper rim of the side portion. The upper section 230 forms an enclosure with the lower section of the drum with the upper section being parallel to the disk-shaped bottom portion 218 of the lower section. The upper section 230 is held in place on the side portion 220 by a plurality of screws 232 which extend through the upper section and which are threaded into the side portion 220.

When one of the information storage cards is fed from a station 82 to one of the pairs of slots on the periphery of the transport member 40, it is held by vacuum pressure on the outer peripheral surface of the side portion 120.

It is important that the cards be fed to the peripheral surface of the transport member 40 in an accurately oriented position so that they may be properly processed. The side walls 154 and 158 of each of the stations 82 cooperate with the corresponding supporting shelf 150 to direct the cards with a proper orientation to the adjacent pair of slots on the peripheral surface of the side portion 220 of the lower section of the transport member 40. It is usual to include a resilient pusher member (not shown) within each of the stations 82, and this member serves to continually bias the cards forward in the station and toward the mouth of the station so that the cards are firmly held in a stacked condition in the station.

A plurality of deflector rings 240 are supported within the interior of the transport member 40 in press fit with the inner surface of the annular side portion 220. A different one of these rings is positioned between each of the pairs of annular slots, one of these rings being shown in FIGURE 7 as disposed between the annular slots 60. The deflector rings are each tapered toward the center of the transport member to prevent turbulence and to provide a streamlined path for air which is drawn in through the pair of slots 60 and through the other pairs of slots referred to in FIGURE 1.

The portion 218 of the lower section of the transport member 40 has an annular sleeve 241 which extends downwardly. The sleeve 241 fits on a collar 242 provided at one end of a hollow shaft 244, and it has a friction fit with the collar. Therefore, rotation of the hollow shaft 244 causes the transport member 40 to rotate. Also, the interior of the shaft 244 communicates with the interior of the transport member.

Bearings 246 are provided at opposite ends of the shaft 244. The inner races of the bearings 246 are mounted on the shaft 244, and the outer races of the bearings are disposed against bushings 248 secured to a housing 250 by a plurality of studs 252. An arcuate opening 256 is provided in the bushing 250 between the bearings 246. This opening enables a belt drive 258 to extend into the housing and around the belt 260. The pulley 260 is keyed to the shaft 244 between the bearings 246, and it is held against axial movement by a pair of sleeves 262 positioned on the shaft between the bearings and the pulley. In this manner, the shaft 244 and the member 40 can be rotated by a suitable motor (not shown) coupled to the pulley 260 by the drive belt 258.

The bearings 246 and the sleeves 262 are held on the shaft 244 by a nut 266. The nut 266 is screwed on a threaded portion at the bottom of the shaft, and it is maintained in a fixed position on the shaft by a lock washer 264. A sealing disk 268 is also screwed on the threaded portion at the bottom of the shaft 244. The sealing disk 268 operates in conjunction with a bottom plate 270 to resist the movement of air between the interior of the housing 250 and the interior of the hollow shaft 244 when a difference of pressure exists between the housing and the shaft.

The bottom plate 270 is secured to the housing 250 by a plurality of studs 272, and the bottom plate is provided with a central opening. A hollow conduit 274 extends into the opening in friction fit with the plate 270. The conduit 274 is axially aligned with the hollow shaft 244 so that air may be exhausted from the hollow interiors of the shaft and of the conduit by a vacuum pump 276. The vacuum pump may be of any suitable known construction and for that reason is shown only in block form in FIGURE 7.

The vacuum pump 276 draws air in through the annular slots 60 and through the other pairs of annular slots 42, 44, 46, 48, 50, 52, 54, 56, 58, 60 in the rotatable member 40. This air is drawn through the interior of the rotatable transport member 40 down the shaft 244 and through the conduit 274. This creates a vacuum pressure at the different circulating paths on the outer peripheral surface of the annular portion 220 of the lower section of the transport member. The deflector rings, such as the deflector ring 240, assure that the air will flow smoothly through the interior of the transport member 40 and with a minimum of turbulence. This provides a high and adequate vacuum pressure around the outer peripheral surface of the annular side portion 220 of the transport to firmly retain the cards against the pairs of annular slots on that surface.

Figure 8:
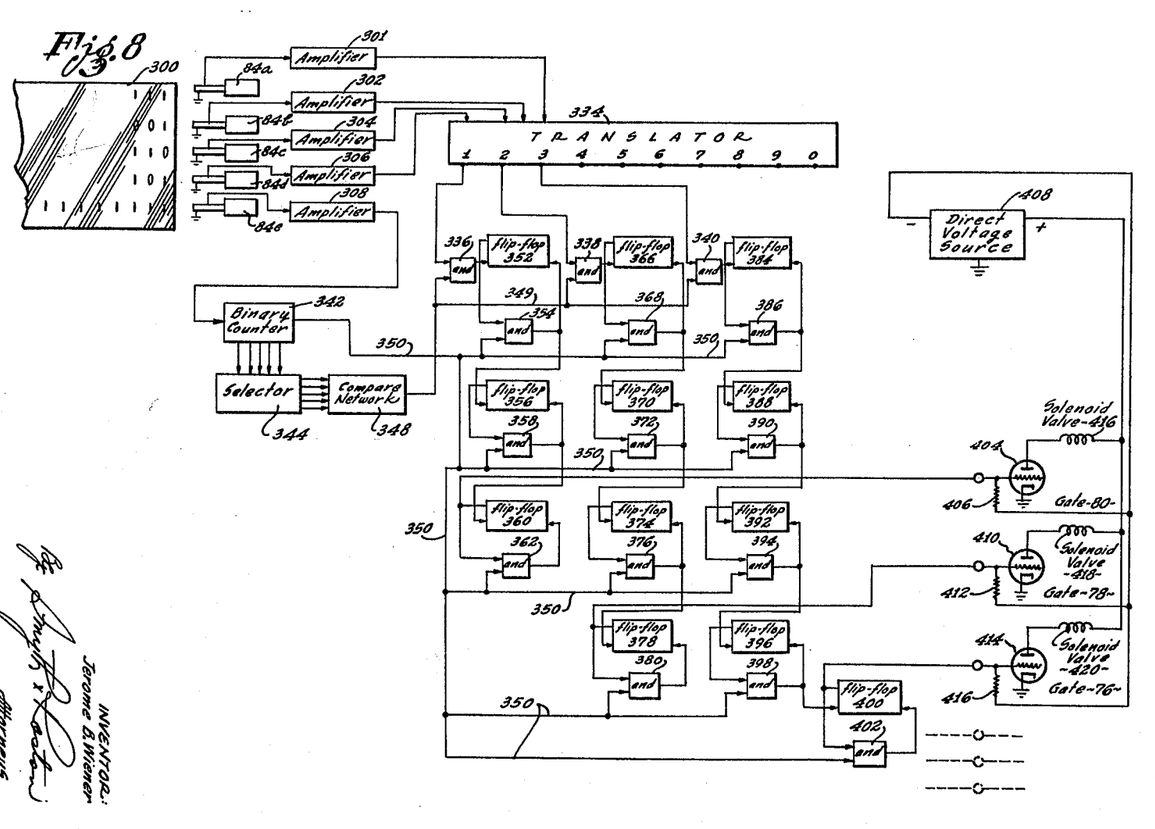
FIGURE 8 is a block diagram illustrating a suitable logic control system which may be used to selectively control the transfer of cards from one of the transport members of FIGURE 1 to the other.

As noted above, the apparatus of the present invention is appropriate for performing a decimal sort of the information cards received from the input station 20. The logic control circuitry of FIGURE 8 illustrates an appropriate control system that may be used in conjunction with the gate transfer members 62, 64, 66, 68, 70, 72, 74, 76, 78 and 80. For a first pass, this control system may be set to respond to the information at a position on each card corresponding to a selected level (such as the "tens" level) of the decimal digits of the information recorded on the cards. Then, the control system of FIGURE 8 is effective to activate the corresponding one of the gate transfer members 62, 64, 66, 68, 70, 72, 74, 76, 78, 80 so that the card bearing a particular decimal digit at the selected ("tens") position will be transferred to the pair of annular slots on the transport drum 40 corresponding to that decimal digit.

For purposes of simplicity, the control system of FIGURE 1 is shown as including those components necessary to process the decimal digits 1, 2 and 3 in the various ordinal levels. It will be understood that duplicate components are normally incorporated so that all the decimal digits of 0–9 of the different levels may be handled. It should also be pointed out that similar control systems such as the system illustrated in FIGURE 8 may be connected to each of the read head transducer means 86, 88, 90, 92, 94, 96, 98, 100, 102 and 104 in FIGURE 1, and these latter control systems may be controlled to respond to the information at a second position on each card (corresponding to the "ones" digits for the first pass, for example), so that the cards may be deposited in the stations 82 in accordance with their decimal digits at the second selected position.

It should also be noted that the control system 80 can be made to perform both functions to cause the system to respond to readings by the transducer means 84 at two different positions on the cards, and by causing the first set of readings to control the gate transfer members 62, 64, 66, 68, 70, 72, 74, 76, 78, 80; and to cause the second readings to control the output stations 82 associated with the previously controlled gate transfer member. This enables the cards to be transferred to the drum 40 in accordance with their decimal digits at one position, and it enables them to be stacked in the different output stations 82 in accordance with their decimal digits at a second position.

In FIGURE 8, one of the cards fed from the input station 20 and transported past the read head transducer means 84 in FIGURE 1 is represented as 300. As noted above, the information is recorded on each card in rows and columns and in binary form. The binary data in each column corresponds to a particular position of the card and it represents a multi-digit binary number whose decimal equivalent, for example, represents a decimal digit in a numerical sequence of from 0 to 9 into which the particular card is to be sorted.

The transducer means 84 of FIGURE 1 is shown in FIGURE 8 as a plurality of electromagnetic transducer read heads 84a, 84b, 84c, 84d and 84e. Each of the read heads reads a different row of binary bits on the card 300. The heads 84a, 84b, 84c and 84d read information rows of binary information, and the head 84e reads a clock row. The clock row includes a plurality of magnetic recordings, with each individual recording corresponding to a binary 1 and with the recordings representing successive positions or columns on the card. Each column contains four separate binary bits for decimal reading.

The heads 84a, 84b, 84c, 84d and 84e are respectively connected to a plurality of amplifiers 301, 302, 304, 306 and 308. The respective output terminals of the amplifiers 301, 302, 304 and 306 are connected to a binary-decimal translator 334, the translator being shown in block form. The translator provides a decoding of binary numbers into corresponding decimal equivalents. Such a translation may be obtained by a binary-coded decimal converter, bi-quinary decoding network or other suitable network or matrix system. Binary-decimal translator networks are extremely well known to the art and, for that reason, the translator 334 is shown merely in block form. The translator 334 may be constructed in a manner similar to that indicated in the lower left corner of FIGURE 1 of Hartley Patent 2,444,042. As will be seen in FIGURE 1 of the Hartley patent, the switches SA2 and SB2 are respective controlled in accordance with the values of binary digits of first and second least digital significance. The switches SC2 and SC3 are controlled in accordance with the value of the binary digit of third least significance. The switches SD2, SD3, SD4, SD5 and SD6 in the Hartley patent are controlled in accordance with the value of the binary digit of fourth least digital significance.

The amplifier 306 in FIGURE 8 of applicant's drawing may control the operation of the switch SA2. In like manner, the amplifier 304 in FIGURE 5 of applicant's drawings may control the operation of the switch SB2 in the Hartley patent. Similarly, the amplifier 304 in FIGURE 8 of applicant's drawings may control the operation of the switches SC2 and SC3 in FIGURE 1 of the Hartley patent.

It will be appreciated that the Hartley patent actually constitutes only one reference and that other references may also be used to indicate the construction of the translator 182. For example, suitable translators are shown in Luhn Patent 2,364,540 and Bray Patent 2,576,099. Amplifiers 301, 302, 304, 306 and 308 are respectively coupled to the heads 84a, 84b, 84c, 84d and 84e to amplify the signals from the heads.

The translator 334 has a plurality of output terminals. For example, when a binary pattern of signal indications is translated into a decimal pattern, the translator 334 actually has ten output terminals each representing a different decimal digit from 0 to 9, and each operating a different one of the gate transfer members 62, 64, 66, 68, 70, 72, 74, 76, 78 and 80 of FIGURE 1. However, only three of the output terminals are shown in FIGURE 8, merely to simplify the description of the system.

The number 1 output terminal of the translator 334 is connected to one of the input terminals of an "and" network 336. The number 2 output terminal of the translator is connected to an input terminal of an "and" network 338, and the number 3 output terminal of the translator is connected to an input terminal of an "and" network 340. The "and" networks are well known to the electronic digital computer art. These networks include transistors or diodes which are connected so that a signal is passed to the output terminal of the network only upon the simultaneous application of input signals to all of its input terminals.

The amplifier 308 is connected to a binary counter 342. A selector network 344 is connected to the individual stages of the binary counter, and the selector is connected to a compare network 348. The selector 344 includes a plurality of switches which may be individually set to any of two positions. These switches may be manually operated, or they may be automatically controlled by a program control element, and the like. When the triggered pattern of the stages of the binary counter 342 corresponds to the setting of the switches in the selector 344, output signals are introduced to all of the input terminals of the compare network 348. The compare network 348 is similar to an "and" network, and it develops an output pulse on the lead 349 only when signals are introduced to all of its input terminals corresponding to the condition described above.

The compare network 348 therefore provides an output pulse for a given number of input pulses to the binary counter 342. This corresponds to a particular count of the clock recordings on the information storage card 300. The point at which the compare network 248 develops an output pulse is dependent upon the manual setting of the selector 344. The binary counter itself develops an output pulse on the lead 350 corresponding to the full count of the clock recordings, which pulse corresponds to the end of the card being processed by the read heads 84a, 84b, 84c and 84d.

Therefore, as the read head 84d scans the row of clock recordings on the card 300, a pulse is introduced to the binary counter 342 for each successive position of the card 300 as it is processed by the transducers. These pulses are counted by the binary counter 342 until the selected position of each card is reached. At that time, the pattern of stages in the binary counter corresponds to the established pattern of the switches in the selector 344, so that the compare network 348 is able to develop an output signal which is introduced to the "and" networks 336, 338 and 340. At the termination of processing of each card, the binary counter 342 develops an output signal on the lead 350.

The "and" network 336 is connected to the left input terminal of a flip-flop 352. The lead 350 from the binary counter 342 is connected to an input terminal of an "and" network 354, and the left output terminal of the flip-flop 352 is also connected to an input terminal of this "and" network. The output terminal of the "and" network 354 is connected to the right input terminal of the flip-flop 352, and this output terminal is also connected to the left input terminal of a flip-flop 356.

Flip-flops such as those referred to above are also well known to the electronic digital computer art. The flip-flops are provided with two stages which may be designated for convenience as the left and right stages each having an input terminal and an output terminal. These flip-flops are bi-stable relaxation oscillators, and they may be triggered to a true state, for example, by a negative signal introduced to the left input terminal when the left stage is conducting; and they may be triggered to a false state, for example, by a negative signal introduced to the right input terminal when the right stage is conducting. A relatively high voltage appears at the left output terminal of the flip-flop when it is in the true state, and a relatively high voltage appears at the right output terminal when the flip-flop is in the false state.

The left output terminal of the flip-flop 356 is connected to an input terminal of an "and" network 358, and the lead 350 from the binary counter 342 is connected to a second input terminal of that "and" network. The output terminal of the "and" network 358 is connected to the right input terminal of the flip-flop 356 and to the left input terminal of a flip-flop 360. The left output terminal of the flip-flop 360 is connected to an input terminal of an "and" network 362, and the lead 350 from the binary counter 342 is connected to a second input terminal of that "and" network. The output terminal of the "and" network 362 is connected to the right input terminal of the flip-flop 360.

The output terminal of the "and" network 338 is connected to the left input terminal of a flip-flop 366. The left output terminal of the flip-flop 366 is connected to the input terminal of an "and" network 368. The lead 350 from the binary counter 342 is connected to a second input terminal of the "and" network 368, and the output terminal of the "and" network 368 connects with the left input terminal of a flip-flop 370 and with the right input terminal of the flip-flop 366. The left output terminal of the flip-flop 370 is connected to an input terminal of an "and" network 372, and the lead 350 from the binary counter 342 is connected to a second input terminal of the "and" network 372.

The output terminal of the "and" network 372 is connected to the right input terminal of the flip-flop 370 and to the left input terminal of a flip-flop 374. The left output terminal of the flip-flop 374 is connected to one of the output terminals of an "and" network 376. The lead 350 from the binary counter 342 is connected to a second input terminal of this latter "and" network 376.

The output terminal of the "and" network 376 is connected to the right input terminal of the flip-flop 374 and to the left input terminal of a flip-flop 378. The left output terminal of the flip-flop 378 is connected to one of the input terminals of an "and" network 380. The lead 350 from the binary counter 342 is also connected to a second input terminal of the "and" network 380, and the output terminal of the "and" network is connected to the right input terminal of the flip-flop 378.

The output terminal of the "and" network 340 is connected to the left input terminal of a flip-flop 384. The left output terminal of the flip-flop 384 is connected to one of the input terminals of an "and" network 386, and the lead 350 from the binary counter 342 is also connected to an input terminal of the "and" network 386. The output terminal of the "and" network 386 is connected to the right input terminal of the flip-flop 384 and to the left input terminal of a flip-flop 388. The left output terminal of the flip-flop 388 is connected to an input terminal of an "and" network 390, and the lead 350 from the binary counter 342 is also connected to that "and" network.

The output terminal of the "and" network 390 is connected to the left input terminal of a flip-flop 392, and to the right input terminal of the flip-flop 388. The left output terminal of the flip-flop 392 is connected to an input terminal of an "and" network 394, and the lead 350 from the binary counter 342 is connected to a second input terminal of that "and" network.

The output terminal of the "and" network 394 is connected to the right input terminal of the flip-flop 392 and to the left input terminal of a flip-flop 396. The left output terminal of the flip-flop 396 is connected to an input terminal of an "and" network 398, and the lead 350 from the binary counter 342 is also connected to that "and" network.

The output terminal of the "and" network 398 is connected to the right input terminal of the flip-flop 396 and to the left input terminal of a flip-flop 400. The left output terminal of the flip-flop 400 is connected to an input terminal of an "and" network 402, and the lead 350 is also connected to that "and" network. The output terminal of the "and" network 402 is connected to the right input terminal of the flip-flop 400.

The left output terminal of the flip-flop 360 is connected to the control grid of a triode 404. The cathode of the triode is grounded, and its control grid is connected to a resistor 406. The resistor 406 is connected to the negative terminal of a direct voltage source 408, and the anode of the triode is connected to one terminal of the energizing winding of a solenoid valve 416. The other terminal of this energizing winding is connected to the positive terminal of the direct voltage source. When the triode 404 is rendered conductive, the energizing winding of the solenoid valve 416 is energized to open the solenoid valve. This produces a stream of pressurized fluid at the gate 80 in FIGURE 1 to effectuate the transfer of a card coming under its influence from the helical path 12 of the transport member 10 to the pair of slots 54 of the transport member 40.

The left output terminal of the flip-flop 378 is connected to the control grid of a triode 410, this latter control grid being connected to a resistor 412 which in turn connects with the negative terminal of the direct voltage source 408. The cathode of the triode 410 is grounded, and its anode is connected to one terminal of the energizing winding of a solenoid valve 418. The other terminal of this winding is connected to the positive terminal of the direct voltage source 408. The solenoid valve 418 is associated with the gate 78 in FIGURE 1 to activate that gate when the energizing winding of the solenoid valve 418 is energized.

The left output terminal of the flip-flop 400 is connected to the control grid of a triode 414, this control grid being connected to a resistor 416. The resistor 416 is connected back to the negative terminal of the direct voltage source 408, and the cathode of the triode is grounded. The energizing winding of a solenoid valve 420 is interposed between the anode of the triode 414 and the positive terminal of the direct voltage source 408. The solenoid valve 420 is associated with the gate 76 in FIGURE 1 to activate that gate when the energizing winding is energized.

It will be understood that similar connections are provided for the gates 74, 72, 70, 68, 66, 64 and 62 in FIGURE 1. When such connections are made, and when appropriate equivalent circuitry is included in the system of FIGURE 8, the cards on the helical path 12 of the transport member 10 may be directed to respective ones of the pairs of annular slots 42, 44, 46, 48, 50, 52, 54, 56, 58 and 60 on the transport member 40. This selective transfer, as explained above, is determined upon the decimal equivalent of the binary number recorded at a selected position on the cards transported on the transport member 10.

To place the equipment of FIGURE 1 into operation, the feed wheel 30 of the input station 20 is activated so that it rotates and feeds the information cards from the input station in succession to the entrance of the path 12 on the transport member 10. The pressurized fluid is introduced from its source into the chamber 16 in FIGURE 2 through the line 18 so that the path 12 may be activated for transporting the cards. This activation, as explained above, is due to the angled pressurized jets emerging from the orifices 14. These jets create a Bernoulli effect which causes the cards to move along the surface of the path 12 in intimate contact with the transport member 10.

The information storage cards are successively transported by the path 12 past the read head transducing means 84. This causes the individual transducer heads 84a, 84b, 84c and 84d in FIGURE 8 to generate pulses. The pulses generated by the transducer heads initiate certain control effects which will now be described.

As the cards 300 pass the read head transducers 84a, 84b, 84c, 84d and 84e, the rows of data on the cards are processed by the read head transducers. The read head 84e, as mentioned above, reads the clock pulses recorded on the lower row of the cards, and these clock pulses are amplified by the amplifier 308 and introduced to the binary counter 342. In the described manner, the compare network 348 generates a pulse when a selected position on each card being processed is reached. Also, a pulse is developed by the binary counter on the lead 350 at the end of the processing of each individual card.

As the cards are transported past the transducer heads 84a, 84b, 84c and 84d, the amplifiers 301, 302, 304 and 306 produce pulses corresponding to the multi-digit binary number recorded at each position of the card. These pulses are used to trigger flip-flops in the transistor 334 so that such flip-flop may assume operational states corresponding to the binary number of the processed position of each card. The translator then responds to the position of the flip-flops to produce at a corresponding one of its output terminals a pulse which is the decimal equivalent of the states of the flip-flops. As mentioned above, only three such output terminals, corresponding respectively to the decimal digits 1, 2 and 3, are shown in FIGURE 8. However, in an actual constructed embodiment of the invention, ten output terminals would be used for the translator 334 corresponding to the decimal digits of from 0 to 9, inclusive.

The pulses from the output terminals 1, 2 and 3 of the translator 334 are introduced to the "and" networks 336, 338 and 340. However, these "and" networks are conditioned for translation by the compare network 348 only at the selected position of the card being processed. Therefore, the proper one of the flip-flops 352, 336 and 384 is triggered to a true state at the particular position of the card being processed as determined by the particular decimal equivalent represented by the binary data at that position.

Assume that the first card to be processed has at its selected position binary data which represents the decimal equivalent "1." Then, when the first card is processed, the flip-flop 352 will be triggered to a true state by the pulse appearing at the number "1" output terminal of the translator 334. The triggering of the flip-flop 352 to a true state conditions the "and" network 354 for translation. The "and" network 354 subsequently translates a pulse to the left input terminal of the flip-flop 356 at the completion of scanning of the first card, and a pulse appears on the lead 350. The output pulse from the "and" network 354 also returns the flip-flop 352 to a false state so that it may be prepared to respond to the next card being processed, should that card also have a decimal "1" recorded at its selected position.

The triggering of the flip-flop 356 to a true state conditions the "and" network 358 for translation. However, no pulses are translated by the "and" network 358 until the next succeeding card is processed by the read head transducers 84a, 84b, 84c, 84d and 84e. The pulses are translated by the "and" network 358 only after such processing has been completed so that a second pulse appears on the lead 350. This provides the first card with sufficient time to be moved by the path 12 into the vicinity of the gate transfer member 80.

The resulting output pulse from the "and" network 358 returns the flip-flop 356 to a false state to prepare it for the next card, and this output pulse also triggers the flip-flop 360 to a true state. The triggering of the flip-flop 360 to the true state causes the triode 404 to become conductive so that an energizing current flows through the energizing winding of the solenoid valve 416. The solenoid valve 416 therefore introduces the pressurized fluid to the gate transfer member 80 and this occurs as the card reaches the area of influence of that member. The resulting pressurized streams from the gate 80 causes the card to be stripped from the path 12 of the transport member 10 and transferred to the pair of slots 60 of the transport member 40. This is the desired transfer, because all cards with a decimal "1" recorded at the selected position are to be transferred to the pair of slots 60.

After the transfer of the first card from the transport member 10 to the transport member 40, and at the completion of the processing of the second following card, the "and" network 362 passes a pulse to the right input terminal of the flip-flop 360 to return that flip-flop to a false state and thereby terminate the conduction of the triode 404 to de-activate the gate 80.

Assume now that the second card to be processed represents the decimal equivalent "2" at its selected position so that the terminal number 2 of the translator 334 develops an output pulse. This output pulse causes the "and" network 338 to be conditioned for translation so that the flip-flop 336 is triggered to a true state for the second card. The flip-flop 366 now places the "and" network 368 in condition for translation, and at the completion of processing of the second card the resulting pulse on the lead 350 is passed through the "and" network 368. This causes the flip-flop 370 to be triggered to its true state, and it causes the flip-flop 366 to be returned to the false state.

In a manner similar to that described above, the pulse on the lead 350 from the terminal of processing of the third card causes the flip-flop 374 to be triggered to a true state and the flip-flop 370 to be returned to a false state. The triggering of the flip-flop 378 to a true state causes the triode 410 to become conductive so that the gate 78 is activated. This activation of the gate 78 occurs at the precise instant that the second card arrives in the vicinity of that gate, this second card having passed the deactivated gate 80. The resulting activation of the gate 78, causes the second card to be transferred to the pair of slots 58 of the transport member 40, which is desired. After the second card has been transferred to the transport member 40, the third card on the completion of its processing develops a pulse on the lead 350 which returns the flip-flop 378 to its false state so as to de-activate the gate 78.

Assuming that the third card to be processed represents the decimal equivalent "3" at its selected position, in like manner, this latter card causes the flip-flop 384 to be triggered to a true state. Upon the completion of the processing of the third card, the flip-flop 388 is triggered to a true state and the flip-flop 384 is returned to a false state. Then, the completion of processing of the next succeeding or fourth card causes the flip-flop 392 to be triggered to a true state and the flip-flop 388 to be returned to a false state. The completion of processing of the fifth card causes the flip-flop 396 to be triggered to a true state and the flip-flop 392 to be returned to a false state. Finally, the completion of processing of the sixth card causes the flip-flop 400 to be triggered to a true state and the flip-flop 396 to be returned to a false state.

The triggering of the flip-flop 400 to a true state causes the triode 414 to become conductive to activate the gate 76. This activation of the gate 76 occurs at the precise moment that the third card arrives at that transfer gate. This causes the third card to be transferred to the slots 56 of the transport member 40, this being desired because the third card represents a decimal "3" at its selected position. The termination of processing of the seventh card causes the "and" network 402 to pass a pulse to the right input terminal of the flip-flop 400 to terminate the activation of the gate 76.

The control circuit of FIGURE 8, therefore, permits the different gates of FIGURE 1 to be activated at the appropriate times so that cards carrying a decimal equivalent corresponding to the equivalent slots on the member 40 may be switched to those slots. The control system permits the cards from the input station 30 to be sorted into different channels on the transport member 40 in accordance with the decimal equivalent of the information recorded at a selected position on each of the cards.

As noted above, an additional sort may now be made for the cards on any particular channel on the transport member 40. This additional sort may, for example, be in accordance with the decimal equivalents of the binary numbers recorded at the next ordinal level. This latter sort may be achieved by causing the respective read head transducer means 86, 88, 90, 92, 94, 96, 98, 100, 102 and 104 of FIGURE 1 to actuate a control system similar to the control system described in FIGURE 8.

Figure 9:
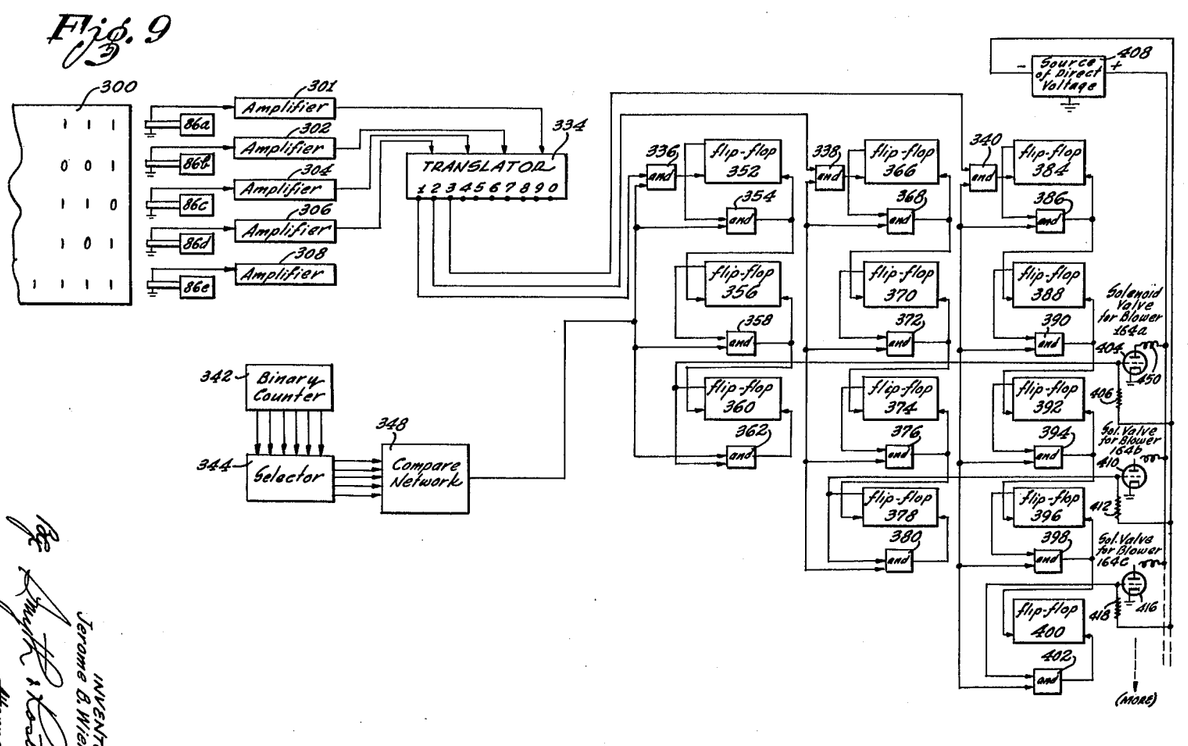
FIGURE 9 is a block diagram of a suitable control system which may be used for controlling the deposit of cards into selected ones of the output stations associated with the latter transport member in FIGURE 1.

One such control system, associated, for example, with the transducer means 86 is shown in FIGURE 9. It will be appreciated that similar control systems may be provided for each of the transducer means listed above.

The control system of FIGURE 9 will function to deposit the cards in corresponding ones of the stations 82 positioned along the pair of slots 42 of the transport member 40. This control system is connected to blower members, such as the blower member 164 of FIGURE 6, associated with the respective output stations 82 along those pair of slots. This causes the cards directed to the uppermost channel in FIGURE 1 of the transport member 40 in accordance with their decimal equivalent at one ordinal level to be deposited in the output stations 82 associated with that level in accordance with their decimal equivalents at the second ordinal level.

With the logic control system of FIGURE 8, therefore, the cards are free run from the input station 20 of FIGURE 1 to the path 12. Then as each card is read by the heads 84a–84e the number recorded at the processed position is stored in the logic circuitry. The stored number is then passed step-by-step through the logic circuitry under the control of the succeeding cards. The number of such steps each number takes before its corresponding gate is actuated is determined by the decimal equivalent of the number itself. Thus, the greater the decimal equivalent, the greater the number of such steps.

The control described in the preceding paragraph permits the cards to move up along the spiral path 12 of FIGURE 1 in synchronism with the step-by-step passage of their decimal equivalents through the logic control circuitry, with each card reading its corresponding gate at the same time its decimal equivalent is caused to activate that gate by the control circuitry.

As noted above, the control system of FIGURE 9 is generally similar to the control system of FIGURE 8, and like components have been represented by the same numerals. In FIGURE 9, the transducer means 86 is illustrated as comprising a plurality of separate transducer read heads 86a, 86b, 86c, 86d and 86e. These read heads scan the different rows of information on the cards, like the card 300, as the cards are carried passed these heads by the transport member 40. These heads are connected to a plurality of amplifiers, which are similar to the amplifiers 301, 302, 304, 306 and 308 in FIGURE 8.

The control system of FIGURE 8 has been described as controlling the various transfer gates between the transport members 10 and 40. The control system of FIGURE 9, on the other hand, controls various blowers, such as the blower 164 of FIGURE 6, associated with the different stations 82 along the uppermost channel of the transport member 40, as mentioned above. Several of these blowers are indicated as 164a, 164b and 164c in FIGURE 9. It will be understood that for a proper decimal sort, 10 output stations will be associated with the pair of slots 42. However, 3 of the blowers are shown merely to simplify the description.

In the system of FIGURE 9, the triode 404 controls the current through a solenoid winding 450 which, in turn, controls the introduction of air pressure to one of the blowers, designated 164a, of an output station 82. In like manner, the triode 410 controls the introduction of air pressure to a second blower 164b, of a second output station, and the triode 416 controls the introduction of air pressure to a third blower 164c, of a third output station. As noted, the control system of FIGURE 9 would normally be expanded to control ten such blowers associated with the ten output stations 82 positioned along the pair of slots 42. As also indicated, control systems identical to the one of FIGURE 9 may be used to control the deposit of cards in the other groups of output stations 82 associated with the other pairs of slots in the transport member 40.

The apparatus and system of the invention, therefore, provides a multi-sort operation on the cards in any particular pass. At the end of any pass, and as mentioned above, the output stations 82 can be conditioned to their feeding mode to permit all the cards to be fed to a common output station. The cards may then be re-deposited in the input station 20 so that a second pass may be effectuated, with the selected processing positions on each card being at a different ordinal level. These passes may then be continued until a complete sort of the cards has been achieved.

Although the invention has been described as performing a decimal sort on the cards, it will be appreciated that this is merely an example and that the system of the invention is equally capable of performing binary sorts and other operations on the cards.

It will be appreciated that it is not necessary to synchronize the operations of all the flip-flops in the control system of 8 and 9 from a single binary counter 342 controlled by the read head 84. Instead, a separate read head and associated logic could be disposed adjacent each of the transfer gates 62, 64, 66, 68, 70, 72, 74, 76, 78 and 80 to determine whether a particular card is to be transferred or not by the corresponding transfer gate. For example, an indication of "1" read by the head adjacent the gate 80 at the proper position on the card would be introduced to the "and" network 358 for passage through the "and" network upon the production of a relatively high voltage on the left output terminal of the flip-flop 356. Similarly, an indication of "2" read by the head adjacent the gate 78 at the proper position on the card would be introduced to the "and" network 372 in FIGURE 9 for passage through the "and" network upon the production of a relatively high voltage on the left output terminal of the flip-flop 370.

It will also be appreciated that appropriate automatic control circuitry may be provided for returning the cards to the input station 20 at the end of each pass and for initiating the next pass. Such circuitry would enable the system to perform automatically from pass to pass until the desired sort could be fully performed. It should also be noted that the receiving means 82 are not necessarily stacking stations, but may be any other appropriate means for receiving the cards during the various sorting operations.

The invention provides, therefore, improved and compact apparatus in which the sorting process performed on a group of information cards may be materially speeded up. This latter objective is realized by virtue of the fact that the apparatus is capable of performing a plurality of sorting operations on each card for each individual pass. Moreover, the invention has the feature in that these sorting operations are performed in an essentially three-dimensional configuration so that the optimum compactness of the apparatus may be realized.

It should also be appreciated that all of the transducing heads can be disposed in coupled relationship to the cards on the transport means 10. For example, it is believed that a person skilled in the art would appreciate that the heads 86 can be disposed in coupled relationship to the cards on the transport means 10 to operate with the circuitry shown in FIGURE 9 for controlling the movements of the cards with the transport means 40. It will also be appreciated that the heads 84 can perform the functions of both the heads 84 and 86 by appropriately modifying the circuitry shown in FIGURE 9 to respond to the signals from the heads 84.

It is also believed that a person skilled in the art would appreciate how to adapt the invention to automatically obtain a plurality of successive sorts. For example, a plurality of transport means corresponding to the transport means 12 can be disposed at spaced positions around the periphery of the transport means 12. Each of these peripheral transport means will receive cards having a different "tenths" digit than those received by the other transport means and will control the movements of the cards in accordance with the value of the "hundredths" digit. Transport means corresponding to the transport means 40 will then be associated with each of the peripheral transport means described above to control the movements of the cards in accordance with the "thousandths" digit.

What is claimed is:

1. In combination for processing a group of information storage cards each containing information at a plurality of positions on the cards, input means constructed to hold the information storage cards in the group, first transport means for the cards, means disposed relative to the input means for obtaining a transfer of cards from the input means to the transport means, second multi-path transport means for the cards, the second multi-path transport means being provided with a plurality of paths each disposed to receive cards from the first transport means, a plurality of gate members each disposed relative to the first transport means and an individual one of the paths in the multi-path transport means to obtain a transfer of cards between the first transport means and the individual ones of the paths in the multi-path transport means, a plurality of output means disposed in groups with the output means in each group being disposed in spaced relationship along an individual one of the paths in the multi-path transport means to receive the cards travelling along the individual path in the multi-path transport means, transducing means disposed relative to the transported cards for processing information on the cards before the movement of the cards to the gate members and before movement of the cards to the output means, first electrical circuitry responsive to first particular information obtained by the transducing means from each transported card for delaying such information until the movement of the card to the position for transfer to a particular one of the paths in the multi-path transport means by the particular one of the gate members in the plurality representing such first particular information and for obtaining an operation of the particular gate member upon the movement of the card to the position for transfer of the card by the particular gate member, and second electrical circuitry responsive to second particular information obtained by the transducing means from each transported card for delaying such information until the movement of the card along the particular one of the paths in the multi-path transfer means to the position for transfer to a particular one of the output means in the group associated with that particular path and representing the second particular information and for obtaining a transfer of the card to the particular output means upon the movement of the card to the particular output means.

2. In combination for processing a group of information storage cards each containing information on the cards; at least one input station for the information storage cards, first transport means for the cards, means disposed relative to the cards in the input station for obtaining a controlled transfer of cards from the input station to the first transport means; second multi-path transport means for the cards; gate transfer means disposed relative to the first transport means and to the second multi-path transport means for selectively directing the cards from the first transport means to the individual paths on the second transport means; a plurality of output stations disposed in groups with the stations in each group being disposed relative to an individual one of the paths on the second transport means to receive the cards moving in that path, transducing means disposed relative to the transported cards for sensing and decoding information on such cards; means responsive to first particular information from the transducing means for producing control signals in accordance with such first particular information and for delaying such control signals until the movement of the cards to the position for transfer by the gate means to the individual ones of the paths representative of such information on the second transport means and for thereafter obtaining an operation of the gate means to provide a transfer of the cards to such individual ones of the paths on the second transport means; and means responsive to second particular information from the transducing means for producing second control signals and for delaying such second control signals until the movement of the cards on the individual ones of the paths on the second transport means to the output stations representative of said second particular information and for thereafter obtaining a transfer of the cards into such representative stations.

3. In combination for processing a group of information storage cards each containing information on the cards, an input station for a group of information storage cards, first transport means constructed to hold cards on the transport means and to provide a movement of the cards through different distances along a particular path, means operative upon the cards in the input stack for obtaining a controlled transfer of cards to the first transport means, second multi-path transport means disposed adjacent the first transport means and constructed to hold cards on the transport means and to provide a movement of the cards, a plurality of gate transfer members each disposed relative to the first transport means at a different position along the particular path and each disposed relative to an individual one of the paths of the multi-path transport means to obtain a transfer of cards from the first transport means to the individual path on the second transport means in a first operative relationship and to prevent such a transfer in a second operative relationship, means including transducing means disposed relative to the transported cards for processing information on the transported cards, a first electrical control system operatively coupled to the transducing means for processing first information on the transported cards and for selectively activating the gate transfer members in the plurality in accordance with such processed information and upon the movement of the cards to the position for the transfer by the selected gate transfer mechanism to selectively direct the cards to different ones of the paths on the multi-path transport means in accordance with the processing of the first information on the transported cards, and a second electrical control system operatively coupled to the transducing means for processing second information on the transported cards and for controlling the movements of each card on a particular one of the paths on the multi-path transport means in accordance with the processing of the second information on the transported cards, the first transport means including a hollow member having a plurality of angled fluid-emitting orifices therein to create a force to retain the cards on the first transport means and to move the cards along a spiral path constituting the particular path around the first transport means.

4. In combination for processing a group of information storage cards each containing information on the cards, an input station for a group of information storage cards, first transport means constructed to hold cards on the transport means and to provide a movement of the cards through different distances along a particular path, means operative upon the cards in the input stack for obtaining a controlled transfer of cards to the first transport means, second multi-path transport means disposed adjacent the first transport means and constructed to hold cards on the transport means and to provide a movement of the cards, a plurality of gate transfer members each disposed relative to the first transport means at a different position along the particular path and each disposed relative to an individual one of the paths of the multi-path transport means to obtain a transfer of cards from the first transport means to the individual path on the second transport means in a first operative relationship and to prevent such a transfer in a second operative relationship, means including transducing means disposed relative to the transported cards for processing information on the transported cards, a first electrical control system operatively coupled to the transducing means for processing first information on the transported cards and for selectively activating the gate transfer members in the plurality in accordance with such processed information and upon the movement of the cards to the position for the transfer by the selected gate transfer mechanism to selectively direct the cards to different ones of the paths on the multi-path transport means in accordance with the processing of the first information on the transported cards, and a second electrical control system operatively coupled to the transducing means for processing second information on the transported cards and for controlling the movements of each card on a particular one of the paths on the multi-path transport means in accordance with the processing of the second information on the transported cards, second transport means including a rotatably mounted hollow drum having spaced slots formed in its periphery to create a vacuum at the periphery and further including means coupled to the drum for creating a vacuum pressure at said slots to retain the cards on the peripheral surface of the drum.

5. In combination for processing a group of information storage cards each containing information on the cards, an input station for a group of information storage cards, first transport means constructed to hold cards on the transport means and to provide a movement of the cards through different distances along a particular path, means operative upon the cards in the input stack for obtaining a controlled transfer of cards to the first transport means, second multi-path transport means disposed adjacent the first transport means and constructed to hold cards on the transport means and to provide a movement of the cards, a plurality of gate transfer members each disposed relative to the first transport means at a different position along the particular path and each disposed relative to an individual one of the paths of the multi-path transport means to obtain a transfer of cards from the first transport means to the individual path on the second transport means in a first operative relationship and to prevent such a transfer in a second operative relationship, means including transducing means disposed relative to the transported cards at a position near the transfer of cards from the input station to the first transport means for processing information on the transported cards prior to the movements of the cards to any of the positions for transfer from the first transport means to the second transport means, a first electrical control system operatively coupled to the transducing means for processing first information on the transported cards and for selectively activating the gate transfer members in the plurality in accordance with such processed information and upon the movement of the cards to the position for the transfer by the selected gate transfer mechanism to selectively direct the cards to different ones of the paths on the multi-path transport means in accordance with the processing of the first information on the transported cards, and a second electrical control system operatively coupled to the transducing means for processing second information on the transported cards and for controlling the movements of each card on a particular one of the paths on the multi-path transport means in accordance with the processing of the second information on the transported cards, the first transport means including a hollow member having a plurality of angled fluid-emitting orifices therein to create a force to retain the cards on the first transport means and to move the cards along a spiral path constituting the particular path around the first transport means.

6. In combination for processing a group of information storage cards each containing information on the cards, an input station for a group of information storage cards, first transport means constructed to hold cards on the transport means and to provide a movement of the cards through different distances along a particular path, means operative upon the cards in the input stack for obtaining a controlled transfer of cards to the first transport means, second multi-path transport means disposed adjacent the first transport means and constructed to hold cards on the transport means and to provide a movement of the cards, a plurality of gate transfer members each disposed relative to the first transport means at a different position along the particular path and each disposed relative to an individual one of the paths of the multi-path transport means to obtain a transfer of cards from the first transport means to the individual path on the second transport means in a first operative relationship and to prevent such a transfer in a second operative relationship, means including transducing means disposed relative to the transported cards at a position near the transfer of cards from the input station to the first transport means for processing information on the transported cards prior to the movements of the cards to any of the positions for transfer from the first transport means to the second transport means, a first electrical control system operatively coupled to the transducing means for processing first information on the transported cards and for selectively activating the gate transfer members in the plurality in accordance with such processed information and upon the movement of the cards to the position for the transfer by the selected gate transfer mechanism to selectively direct the cards to different ones of the paths on the multi-path transport means in accordance with the processing of the first information on the transported cards, and a second electrical control system operatively coupled to the transducing means for processing second information on the transported cards and for controlling the movements of each card on a particular one of the paths on the multi-path transport means in accordance with the processing of the second information on the transported cards, the second transport means including a rotatably mounted hollow drum having spaced slots formed in its periphery to create a vacuum at the periphery and further including means coupled to the drum for creating a vacuum pressure at said slots to retain the cards on the peripheral surface of the drum.

References Cited in the file of this patent

UNITED STATES PATENTS

| | | |
|---|---|---|
| 1,595,478 | Minton | Aug. 10, 1926 |
| 2,039,016 | McGuinness | Apr. 28, 1936 |
| 2,795,328 | Tyler | June 11, 1957 |
| 2,812,079 | Carnine et al. | Nov. 5, 1957 |
| 2,883,189 | Wilson | Apr. 21, 1959 |
| 2,900,146 | Hafner | Aug. 18, 1959 |
| 2,905,466 | Azari et al. | Sept. 22, 1959 |

FOREIGN PATENTS

| | | |
|---|---|---|
| 1,136,916 | France | Jan. 7, 1957 |